No. 657,262. Patented Sept. 4, 1900.
G. ANDERSON.
METHOD OF SETTING DIAMONDS, &c., IN METAL HOLDERS.
(Application filed Aug. 29, 1899.)
(No Model.)

WITNESSES:

INVENTOR
George Anderson
ATTORNEYS

UNITED STATES PATENT OFFICE.

GEORGE ANDERSON, OF CARNOUSTIE, SCOTLAND.

METHOD OF SETTING DIAMONDS, &c., IN METAL HOLDERS.

SPECIFICATION forming part of Letters Patent No. 657,262, dated September 4, 1900.

Application filed August 29, 1899. Serial No. 728,890. (No specimens.)

*To all whom it may concern:*

Be it known that I, GEORGE ANDERSON, a subject of the Queen of Great Britain and Ireland, residing at Taymouth Engineering Works, Carnoustie, in the county of Forfar, Scotland, have invented a new and useful Improvement in or Relating to the Setting or Fixing of Diamonds and the Like in Holders, of which the following is a specification.

My invention relates to improvements in the setting or fixing of diamonds and the like in holders; and the object of my improvement is to securely fix these in metal holders, the combined diamonds and holders being applicable for saws used in the cutting of stones, for turning emery-wheels and the like, or for holding diamonds: for any other purpose where it is desirable that they be securely fixed. I attain this object by the mechanism illustrated in the accompanying drawings, in which—

Figure 1:
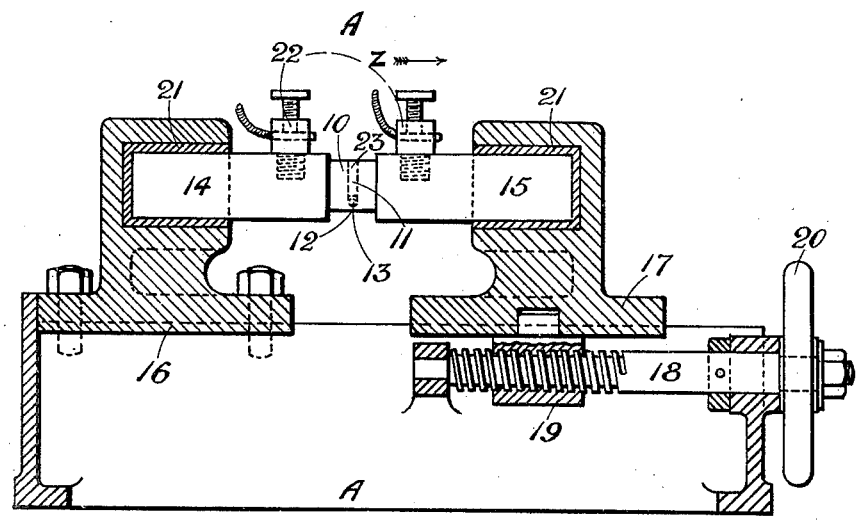
Figure 2:
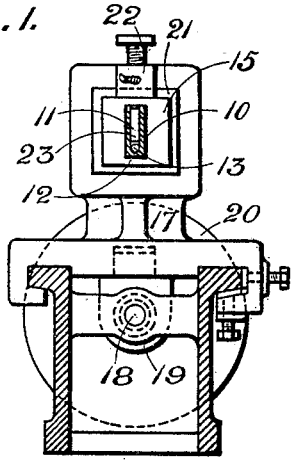

Figure 1 is a sectional elevation showing the diamond-holder in position ready for being treated by the electrical welding and squeezing machine; and Fig. 2 is a cross-section at A A, Fig. 1, looking in the direction of the arrow Z.

Similar numerals refer to similar parts throughout both views.

In carrying out my invention I make the holder 10 of metal—such as, for example, iron or steel—and bore a hole 11 into it from the back or a side and at any desired angle, such hole not coming quite through the face 12, and of sufficient diameter to allow of the diamond 13 being received within it. Such holder, with its diamond in position at the bottom of the hole, is placed between the electrodes or conducting-jaws 14 and 15 of an electrical appliance or furnace, such electrodes being so arranged that they can apply pressure to the holder in a similar manner to that which obtains in a vise, whereby the diamond-holder 10 is held between the electrodes 14 and 15 by pressure and friction. The one electrode 14 is carried by a fixed head 16, while the other 15 is carried by a sliding head 17, such head being actuated by a screw 18, nut 19, and hand-wheel 20. The copper electrodes 14 and 15 are insulated by means of suitable non-conducting material 21, and the electric generator is placed in circuit by means of the contact-pieces 22 in the usual way. On sending a current of electricity through the appliance at the time the holder is held between the electrodes such holder is heated and softened to such a degree that the sides of the hole 11 in it can be squeezed together, the result being that the diamond is solidly set within such holder and that without injury to itself.

Sometimes before subjecting the holder to the process of heating and squeezing I may introduce a short plug 23 into the hole, it being preferably of metal similar to that of the holder, the intention being to weld or otherwise suitably incorporate the plug with the holder, and thus make more certain that the diamond is surrounded and backed by solid metal. The holders so treated can then be removed from the appliance and allowed to cool and afterward can be dressed and fixed into anything suitable—such as, for example, circular saws or the like. In this final step the projecting metal of the holder is ground away by the stone being first operated on until the diamond is sufficiently exposed to act on such stone.

The diamond-holders may be of any desired shape, and they may be applied to or in connection with any suitable industrial process.

Having now described my invention, what I claim as new, and desire to secure by Letters Patent, is—

The method of securing diamonds in metal holders, which consists in drilling a hole almost but not quite through said holder, inserting the diamond into said hole, then heating the holder to a welding heat and closing and welding the sides of the hole back of the diamond, and subsequently grinding away the metal so as to uncover a portion of the diamond, substantially as described.

In witness whereof I have hereunto set my hand in presence of two witnesses.

GEORGE ANDERSON.

Witnesses:
　WILLIAM MARTIN,
　WILLIAM PANTON.